United States Patent [19]

Harney et al.

[11] Patent Number: 5,113,440
[45] Date of Patent: May 12, 1992

[54] UNIVERSAL DECODER

[75] Inventors: Ralph P. Harney, Poway; Michael L. Hightower, San Diego; Anthony J. Wechselberger, Escondido, all of Calif.

[73] Assignee: OCI Communcations, Inc., San Diego, Calif.

[21] Appl. No.: 702,159

[22] Filed: May 15, 1991

Related U.S. Application Data

[63] Continuation of Ser. No. 382,899, Jul. 21, 1989, abandoned.

[51] Int. Cl.$^5$ .................................................. H04N 7/167
[52] U.S. Cl. ........................................ 380/15; 380/10; 380/20
[58] Field of Search .................... 380/8, 10, 15, 17, 20

[56] References Cited

U.S. PATENT DOCUMENTS

| | | | |
|---|---|---|---|
| 3,919,462 | 11/1975 | Hartung et al. | 380/17 |
| 4,019,201 | 4/1977 | Hartung et al. | 380/17 |
| 4,024,576 | 5/1977 | Hartung et al. | 380/17 |
| 4,045,814 | 8/1977 | Hartung et al. | 380/17 |
| 4,091,417 | 5/1978 | Nieson | 380/17 |
| 4,319,273 | 3/1982 | Nossem | 380/15 |
| 4,322,745 | 3/1982 | Saeki et al. | 380/10 |
| 4,460,922 | 7/1984 | Ensinger et al. | 380/20 |
| 4,466,017 | 8/1984 | Banker | 380/15 |
| 4,484,027 | 11/1984 | Lee et al. | 380/21 |
| 4,494,142 | 1/1985 | Mistry | 380/20 |
| 4,494,143 | 1/1985 | Lovick et al. | 380/20 |
| 4,514,761 | 4/1985 | Merrell et al. | 380/20 |
| 4,523,228 | 6/1985 | Banker | 380/11 |
| 4,527,195 | 7/1985 | Cheung | 380/15 |
| 4,542,407 | 9/1985 | Cooper et al. | 380/13 |
| 4,554,579 | 11/1985 | Citta | 358/86 |
| 4,563,702 | 1/1986 | Heller et al. | 380/10 |
| 4,575,755 | 3/1986 | Schoeneberger | 380/15 |
| 4,590,519 | 5/1986 | Zelenz | 380/15 |
| 4,599,647 | 7/1986 | George et al. | 380/10 |
| 4,611,242 | 9/1986 | Williams | 380/20 |
| 4,613,901 | 9/1986 | Gilhousen et al. | 380/20 |
| 4,628,359 | 12/1986 | Okada et al. | 380/20 |
| 4,635,112 | 1/1987 | Tomioka et al. | 380/20 |
| 4,696,034 | 9/1987 | Wiedemer | 380/16 |
| 4,703,354 | 10/1987 | Auld, Jr. et al. | 358/148 |
| 4,712,237 | 12/1987 | Walker | 380/15 |
| 4,712,239 | 12/1987 | Frezza et al. | 380/20 |
| 4,716,588 | 12/1987 | Thompson et al. | 380/20 |
| 4,718,086 | 1/1988 | Rumreich et al. | 380/20 |
| 4,736,421 | 4/1988 | Morita et al. | 380/20 |
| 4,739,510 | 4/1988 | Jeffers et al. | 380/15 |
| 4,790,010 | 12/1988 | Sgrignoli | 380/10 |
| 4,802,214 | 1/1989 | Barany | 380/15 |
| 4,807,286 | 2/1989 | Wiedemer | 380/16 |
| 4,815,129 | 3/1989 | Griffin et al. | 380/15 |
| 4,833,710 | 5/1989 | Hirashima | 380/20 |
| 4,839,569 | 5/1989 | Seth-Smith et al. | 380/10 |
| 4,908,834 | 3/1990 | Wiedemer | 380/15 X |

FOREIGN PATENT DOCUMENTS 0164682  10/1982  Japan ................................. 380/15

*Primary Examiner*—Bernarr E. Gregory
*Attorney, Agent, or Firm*—Kinzer, Plyer, Dorn, McEachran & Jambor

[57] ABSTRACT

A microprocessor based decoder module for television video signals which have been encoded by suppressing sync pulses and/or inverting picture video. The decoder modules generates sync restoration gates and/or video inversion gates developed from timing signals present in the VBI of the encoded video signal. The VBI timing signals may be either sync pulses which are not suppressed during the VBI, or special timing signals inserted at the video encoder. The microprocessor, in the decoder module, may contain externally selectable program segments where each segment will allow decoding of a different variety of video encoding.

17 Claims, 4 Drawing Sheets

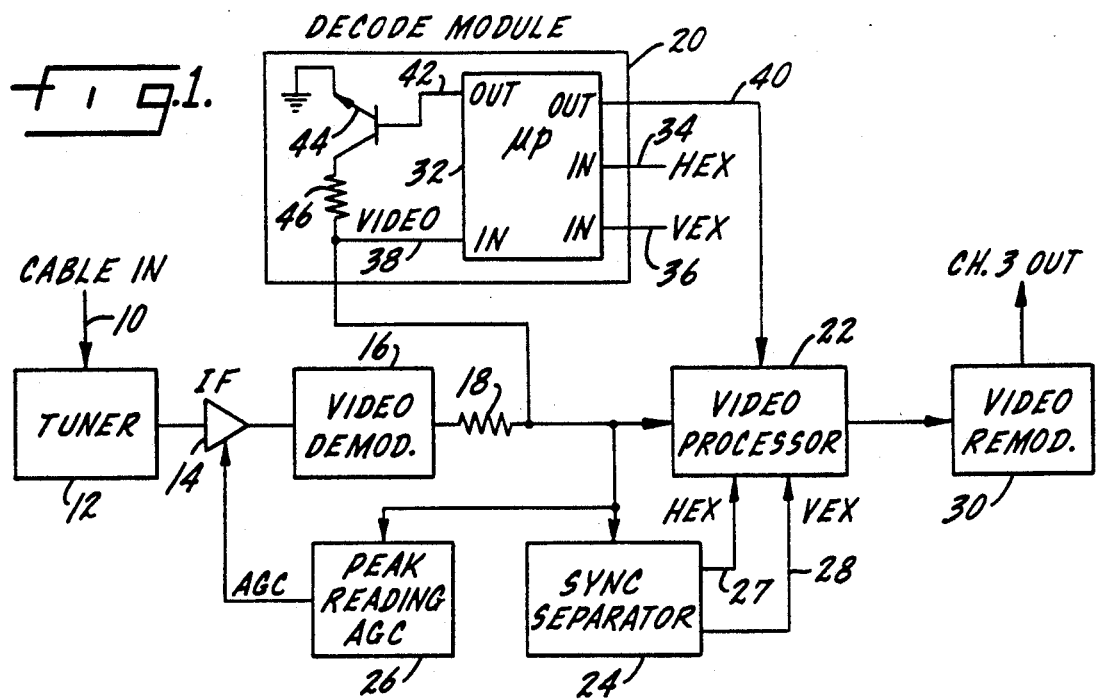
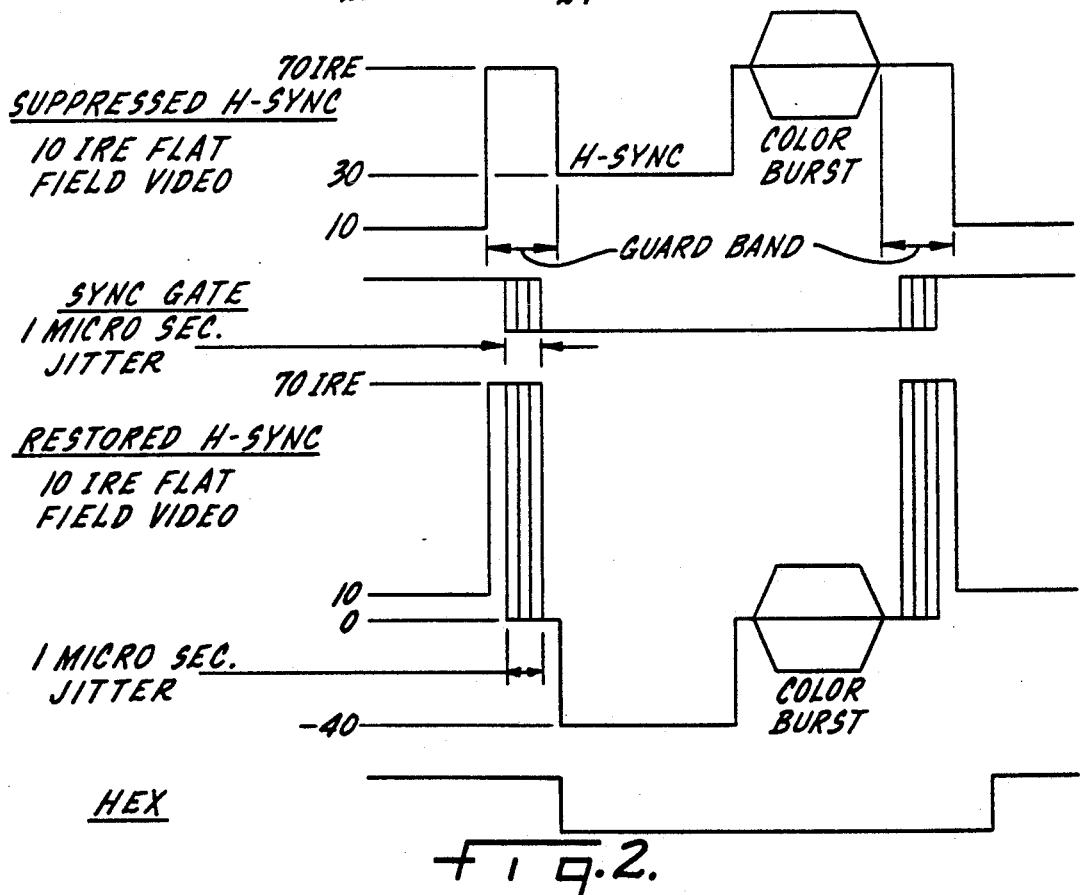

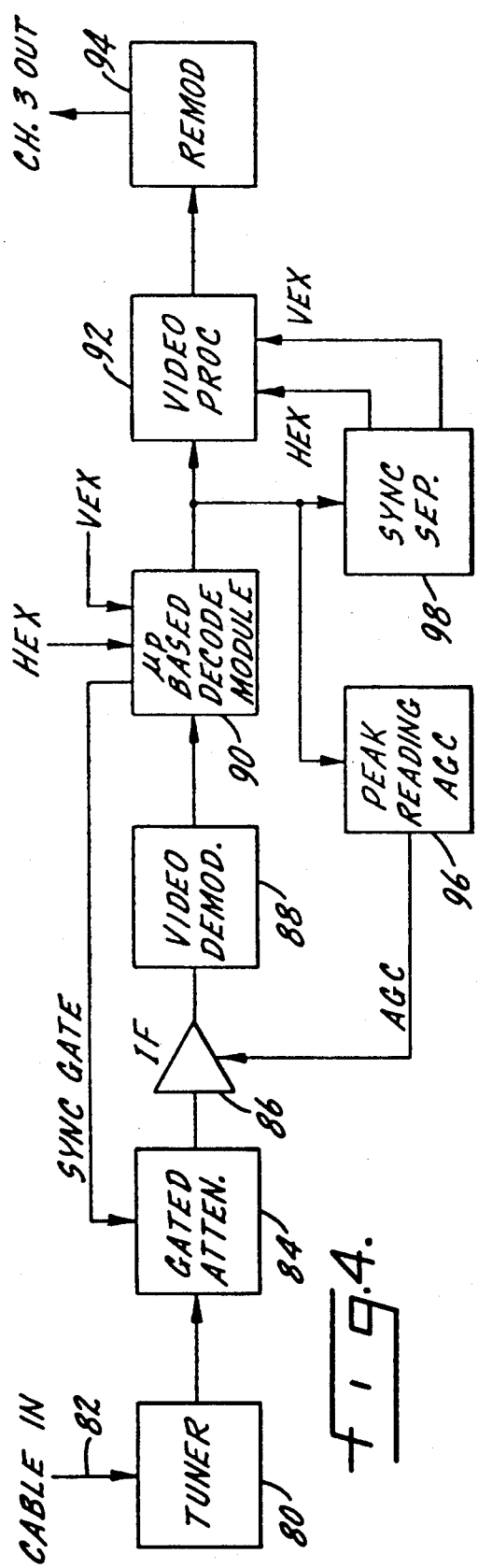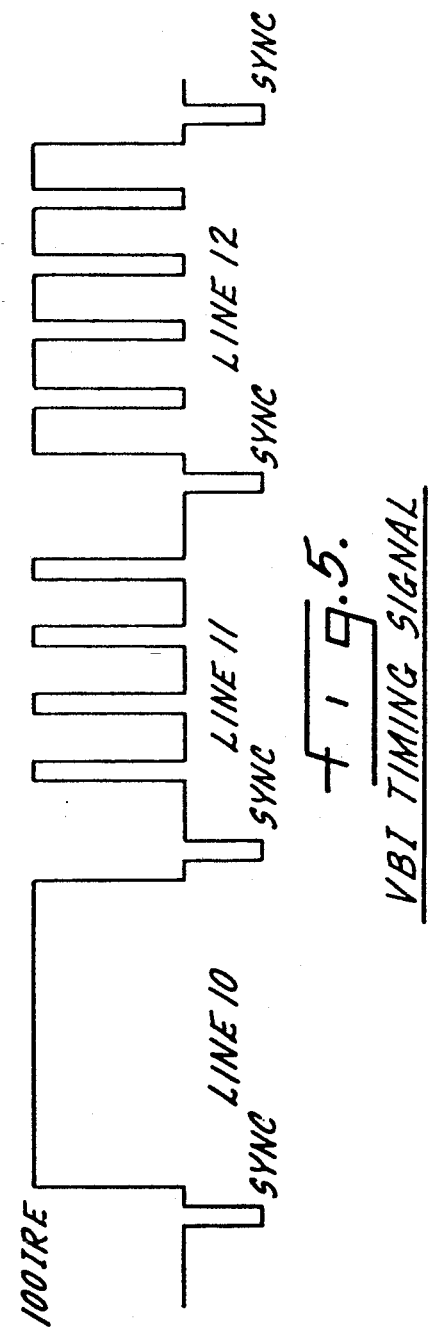

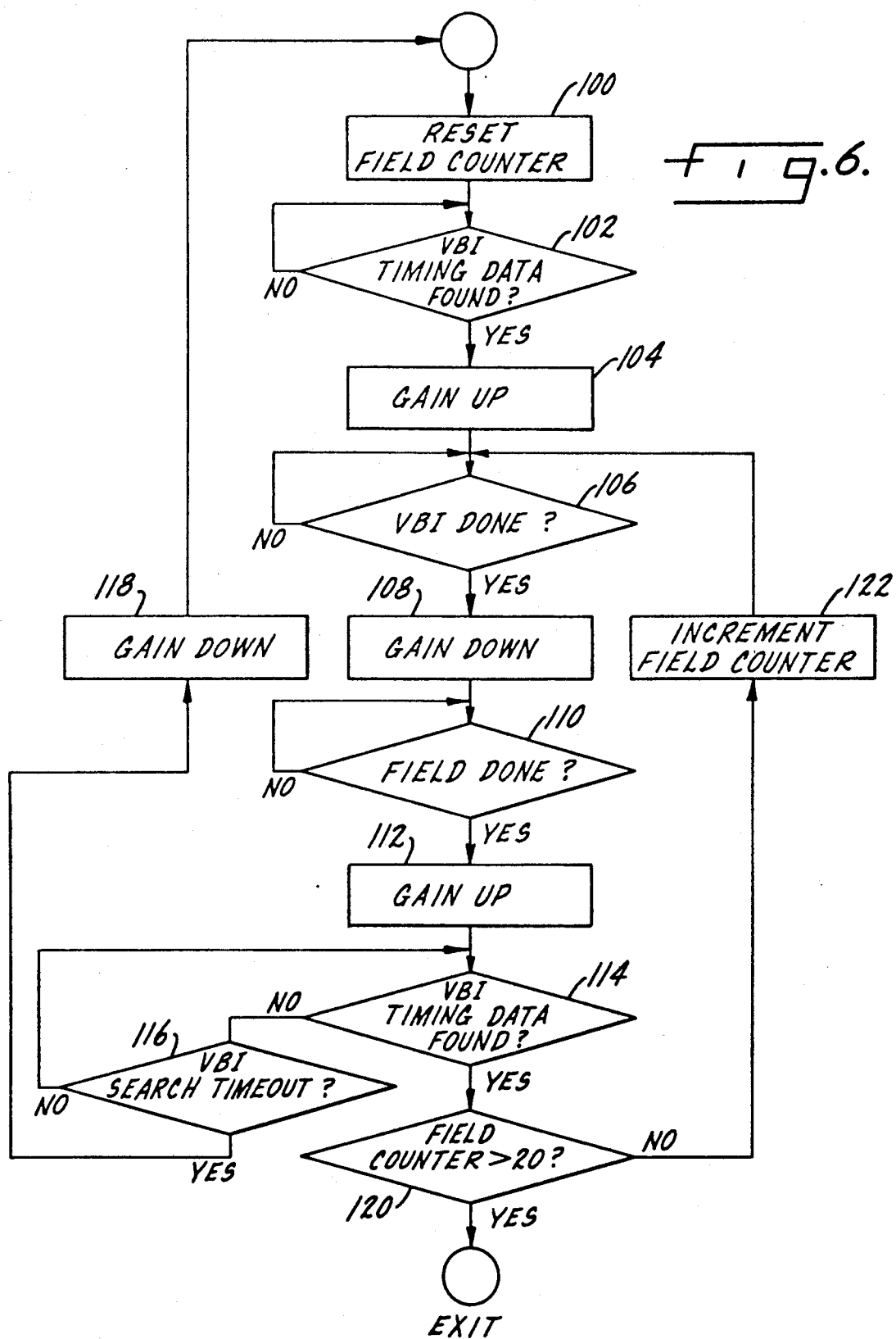

UNIVERSAL DECODER

This is a continuation of copending application Ser. No. 07/382,899 filed on Jul. 21, 1989, now abandoned.

SUMMARY OF THE INVENTION

Many television video encoding schemes suppress synchronizing (sync) pulses in order to render a picture unintelligible on an ordinary TV receiver. The decoders used in these schemes use dedicated discrete logic devices or custom logic integrated circuits and may also include an oscillator that is phase locked to a timing signal in order to generate a sync restoration gate.

The present invention relates to a microprocessor based universal decoding module which is programmed to decode one or more types of encoded television video signals.

One purpose of the invention is a decoder that accepts timing signals at the input ports of a microprocessor which then directly develops a sync restoration gate, under control of a stored program, and delivers said gate to a microprocessor output port.

Another purpose of the invention is a universal decoder of the type described which is programmed to decode several types of suppressed sync encoding, including video inversion encoding, with the decoder option being selected through a hard wire or strap on the decoder, or by addressing the decoder from a cable television head end.

Another purpose is a universal decoder module as described in which the sync suppressed encoding is decoded through the use of timing signals which are in the vertical blanking interval (VBI) of the video signal, with the timing signal being either the unsuppressed horizontal and vertical sync in the VBI or specially formed timing signals incorporated in the VBI at the encoder.

Another purpose is a universal decoder module as described which may accomodate several types of sync suppressed encoding, including video inversion and including encoding in which the sync suppression depth is dynamically varied.

Another purpose is an add-on universal decoder module which may be used with RF attentuated suppressed sync, video inversion encoding, and level shifting horizontal sync supression.

Another purpose is a universal decoder module as described in which a specially formed timing signal may be placed in the VBI at the encoder for use in decoding suppressed sync encoded video signals.

Other purposes will appear in the ensuing specification, drawings and claims.

BRIEF DESCRIPTION OF THE DRAWINGS

The invention is illustrated diagrammatically in the following drawings wherein:

FIG. 1 is a block diagram of one type of decoder module, as installed in a CATV converter, FIG. 2 is a wave form diagram of the decoder module of FIG. 1 showing the relationship between suppressed horizontal sync, the sync gate, restored horizontal sync, and horizontal timing signals, FIG. 4 is a block diagram of a decoder module arranged to decode another type of suppressed sync encoded video signal, FIG. 5 is a waveform diagram of the VBI timing signal for the decoder module of FIG. 4, and FIG. 6 is a program flow chart of the decoder module of FIG. 4.

DESCRIPTION OF THE PREFERRED EMBODIMENT

Figure 3:
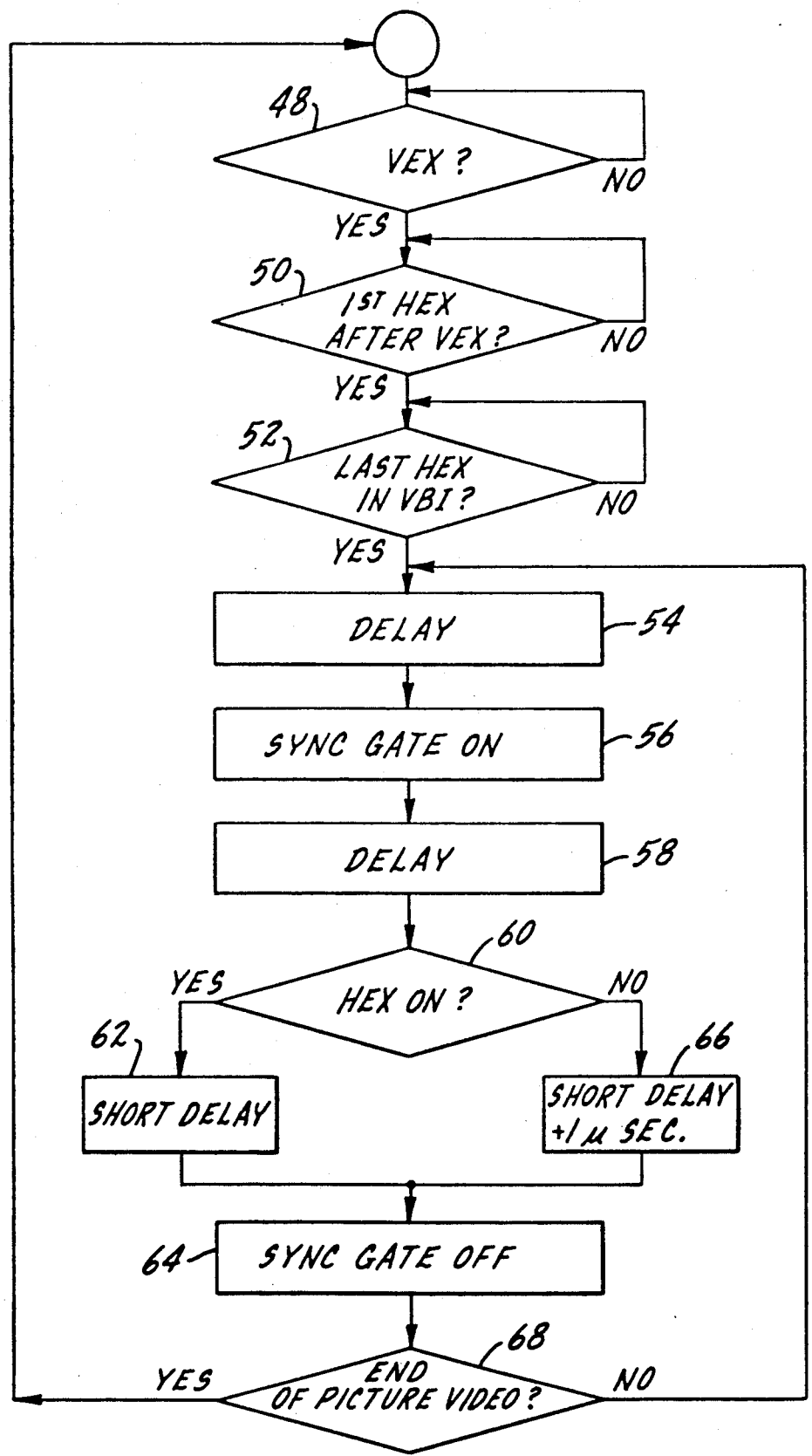
FIG. 3 is a program flow chart for the decoder module of FIG. 1.

A great many of the currently used television encoding techniques suppress synchronizing pulses in order t render a TV picture unintelligible to an ordinary television set. Of the options currently in use, there is suppression of sync pulses during an entire video field and suppression of the sync pulses during picture video only, with both horizontal and vertical sync remaining at normal levels during the vertical blanking interval (VBI). Sync may be suppressed in a number of different ways. There may be a shift in the level of the sync pulses and this is done primarily when the video signal is at baseband frequency. Sync may also be suppressed by attenuation of the sync pulses at RF or at baseband and there may be a variation in the attenuation applied to the sync pulses on a field by field basis, and this variation may be random or may be related to some portion of the video signal. A suppressed horizontal sync pulse is shown in FIG. 2. There is a leading guard band (before the H-sync pulse) and a trailing guard band (after the color burst), each of which is about 2 microseconds wide. The guard bands allow for a timing variation of the sync restoration gate generated in a decoder, which starts during the leading guard band and ends during the trailing guard band. The horizontal sync pulse and both guard bands normally occur during the overscan period on a TV screen and thus are invisible to the viewer.

Under present cable television practice, once a particular cable system has committed to a particular type of video signal encoding, all decoders must be of the same type or must be the product of a single manufacturer. This unreasonably limits a particular cable company in its purchase of new decoders.

The present invention provides a universal decoder in that the decoder module has multiple programs so that it may be used to decode several different types of sync suppressed video encoding. The decoder module may be used in connection with various types of cable television converters to the end that a cable system operator no longer will be required to buy decoders from a particular source, but rather can buy converters containing universal decoder modules from different sources. A cable system may also change over to a new encoding system gradually by installing new decoders that contain a universal decoder module that is compatible with the old encoding system.

The present invention will be described in connection with a cable television converter that incorporates the type of encoding system shown in U.S. Pat. No. 4,336,553 which is essentially the same type of encoding system as shown in U.S. Pat. Nos. 4,340,906 and 4,353,088. It should be understood that the universal decoder module of the present invention can be used with any number of different cable television converters and/or decoders and in no sense should be limited to use with the specific encoding system disclosed in the '553 patent.

In FIG. 1, a cable input 10 provides incoming video at RF to a tuner 12. The output from tuner 12, the video at a suitable intermediate frequency, is connected to an IF amplifier 14 which in turn is connected to a video demodulator 16 which provides the video signal at baseband or video frequency. The output from video demodulator 16 is connected through a resistor 18 to a decode module 20 which provides one of the inputs to a video processor 22.

A sync separator 24 and a peak reading AGC circuit 26 receive inputs of baseband video, with the sync separator being effective to provide the horizontal sync timing signal (HEX) on line 27 and the vertical sync timing signal (VEX) on line 28. The HEX and VEX signals are provided to video processor 22 and to decoder module 20. The output from the peak reading AGC circuit is connected to IF amplifier 14 which provides the gain for the amplifier to maintain the video signal in the converter/decoder at desired voltage levels. With the exception of decoder module 20, the remaining circuits are used in the commercial implementation of the encoding system of the '553 patent.

The video signal which is supplied to tuner 10 has suppressed horizontal sync. In this particular embodiment of the invention the level of the sync has been suppressed only during the horizontal sync interval of the picture portion of the video. There is no suppression of horizontal or vertical sync during the VBI. The decode module 20 is effective to restore the level of the horizontal sync pulses which had been suppressed at the encoder and the video signal with restored horizontal sync during the picture video is the input to video processor 22. The HEX and VEX signals from the sync separator are used in the video processor and the fully restored video signal is then remodulated in modulator 30 to a locally unused channel, for example channel 3, as is conventional in cable television systems.

Decoder module 20 includes a microprocessor 32 which may, for example, be an Intel 8051 type. Microprocessor 32 includes a CPU, program memory, data memory, I/O ports and other peripheral circuits such as a timer, all contained in one or more integrated circuit(s). Microprocessor 32 has HEX and VEX inputs 34 and 36 and a video input 38. The microprocessor has an output on line 40 which controls video signal inversion as will be described later. Microprocessor 32 also has an output on line 42 to a transistor 44 which functions through resistor 46 and resistor 18 as a pulldown circuit to restore the level of horizontal sync in accordance with instructions from the microprocessor.

FIG. 2 shows the relationship between the waveform of suppressed horizontal sync, the sync gate, restored horizontal sync and HEX. FIG. 3 is a flow chart for the program in the microprocessor which functions to control the outputs as described.

In FIG. 2, the normal IRE levels for a horizontal sync pulse and the color burst are indicated in that portion of the diagram designated "restored horizontal sync." The suppressed horizontal sync shows that the level of the sync pulse between the leading and trailing guard bands has been suppressed 70 IRE from a normal sync level of −40 IRE to a suppressed sync level of +30 IRE. The color burst has been similarly level changed. As mentioned above, the leading and trailing guard bands are each about 2 microseconds wide. Microprocessor 32 has an instruction cycle time of one microsecond and its clock signal is asynchronous to the incoming sync pulses of the video signal. The horizontal sync gate, generated by microprocessor 32, will thus have a timing variation (jitter) of one microsecond relative to the horizontal sync pulse. The horizontal sync gate, which is shown to have a one microsecond jitter, is shown between the suppressed horizontal sync waveform and the restored horizontal sync waveform, with the sync gate starting during the leading guard band and ending during the trailing guard band. The sync gate is used to control the restoration of horizontal sync to a normal IRE level. The HEX waveform in FIG. 2 is triggered by and approximately coincident with the start of the horizontal sync pulse.

The FIG. 3 flow chart describes the program followed by microprocessor 32 in restoring the IRE levels of suppressed horizontal sync in a video baseband encoding or scrambling system in which the horizontal and vertical sync pulses in the VBI have not been suppressed. The first step 48 in the program is a search for the VEX signal, and once there is a VEX input to the microprocessor, the next step, as represented at 50, is to determine the first HEX after VEX. A yes output from step 50 initiates step 52 which is to seek the last HEX in a particular vertical blanking interval. When there is an affirmative answer to the test of step 52, after a short delay represented by step 54, the horizontal sync gate will begin, as represented by step 56. As shown in FIG. 2, the sync gate begins during the leading guard band and continues until its termination in the trailing guard band. The one microsecond jitter from the microprocesser clock, which occurs at the beginning and end of the sync gate and is shown in the restored sync, has no effect on the restored sync. After the sync gate has been turned on, as represented by step 56, there is a short delay represented by step 58, with the next step indicated at 60 representing a test as to whether or not the HEX signal is on. If the HEX signal is on, after a short delay indicated by step 62, the sync gate will be turned off, as represented by step 64. If the HEX is not on at step 60, there is a short delay, +1 microsecond, represented by step 66, after which the sync gate is turned off.

The difference between the delays, as represented by steps 62 and 66, is the result of the one microsecond instruction cycle of the microprocessor and the fact that the spacing between horizontal sync pulses is approximately 63.5 microseconds. The microprocessor must switch between sync gate spacings of 63 and 64 microseconds. The HEX pulse is triggered by the restored horizontal sync and the microprocessor tests for a presence of HEX shortly after the start of the sync gate. If HEX is present at this time, a 63 microsecond spacing is selected. If HEX is not yet present, the spacing is 64 microseconds.

When the sync gate is turned off, as represented by step 64, the next step is to determine if that is the end of the picture video, as represented by step 68. If it is not the end of picture video, the program recycles to step 54, to provide horizontal sync gates to raise succeeding horizontal sync pulses in the picture video up to their proper IRE levels. If it is the end of the picture video, the program is recycled back to the beginning where the microprocessor will again search for VEX in the next VBI.

The decode module of FIG. 1, having a microprocessor programmed in accordance with the flow chart of FIG. 3 provides a horizontal sync gate to restore horizontal sync from the suppressed horizontal sync waveform of FIG. 2 to the restored horizontal sync waveform of FIG. 2. This particular example uses coding in the form of a 70 IRE level change for the horizontal sync pulses in the picture video, with the horizontal and vertical sync pulses in the VBI being unsuppressed. The decode module, as so programmed, can function to control decoding of any video signal which has been so encoded.

Many video encoding systems also use video signal polarity inversion as a form of encoding. The decode module of FIG. 1 has microprocessor 32 programmed so as to accomodate such polarity inversion. Only the active or picture video between horizontal sync pulses is inverted. The encoding system disclosed in the above-mentioned '553 patent has a video inversion circuit, as video polarity inversion is a normal part of the encoding disclosed in that patent. A video inversion sig-nal is developed by the microprocessor and provided on line 40 to the video processor and used to control the inversion of the video signal.

When a field is to be inverted, a section of a line during the preceding VBI is elevated to 100 IRE. The line section normally has a zero IRE level. The inversion flag of 100 IRE in the VBI is detected by the microprocessor at the video input and an inversion gate is developed by the microprocessor and provided to the video processor 22 in the period between horizontal sync gates.

The video inversion decoding portion of decoder module 20 has been shown in connection with a particular type of sync suppression encoding. It should be understood that video signal polarity inversion may be used with any form of sync suppression encoding.

FIGS. 4, 5 and 6 relate to the use of the microprocessor based decoder module to decode a signal where each horizontal sync pulse is suppressed during picture video and the entire VBI (including horizontal and vertical sync) is also suppressed. Suppression is accomplished by an RF gated attenuator in the encoder. In order to decode such a video encoded signal, it is necessary to provide a timing signal and the timing signal will be placed in the VBI. Normally, such systems are decoded through the use of a timing signal carried as audio carrier amplitude modulation. However, the same decoding functions can be performed by the use of a timing signal in the VBI. In a mixed decoder system (with universal decoders added) both timing signals are carried simultaneously; the audio carrier signal for pre-existing decoders and the VBI signal for the universal decoders.

As shown in FIG. 5, the timing signal, which will be read by a positive peak reader in the decode module, begins with a solid 100 IRE signal in line 10 which functions to charge the capacitor in the peak reader. Line 11 shows a known timing signal, again having a maximum level of 100 IRE. Line 12 is the complement of line 11. This particular combination of signal levels is extremely unlikely to occur on successive lines of active video and thus there is no likelihood of a false timing signal being utilized by the microprocessor. The VBI timing signal as shown in FIG. 5 will have a data rate which is sufficiently slow so as to be read directly by the microprocessor in the decoder module. The head end video processor, which would add the VBI timing signal, may interface with the encoder to determine when the scrambling parameters, such as sync suppression depth, are being changed dynamically, and such changes can be inserted as data o another VBI horizontal line and passed to the decoder in real time.

Since an RF gated sync encoder attenuates the sync pulses, as opposed to level shifting as disclosed in the FIG. 1-3 embodiment, the sync pull down circuit, illustrated in FIG. 1, will not correctly restore horizontal sync and the color burst. An RF gated attenuator at the converter IF will properly restore the sync pulses.

As shown in FIG. 4, a tuner 80 has a cable input at 82. A gated attenuator 84 is connected to the IF output of tuner 80, with the output from the attenuator being connected to an IF amplifier 86. Video demodulator 88, the microprocessor-based decode module 90, video processor 92, remodulator 94, peak reading AGC 96 and the sync separator circuit 98 are all comparable to the similarly designated circuits in FIG. 1. The principal difference is that the sync gate from microprocesser 90, rather than causing a level change in the suppressed horizontal sync pulses, will increase the amplitude of the horizontal sync pulses and the entire VBI, as described in connection with the flow chart program of FIG. 6.

In FIG. 6, the initial step 100 is the reset of the field counter, which controls the next step indicated at 102, which is a search for the VBI timing data illustrated in FIG. 5. When the timing data is found, the sync gate input to gated attenuator 84 will increase the gain during the VBI interval, as indicated by step 104. The gain will remain at an increased level, to raise the amplitude of the horizontal and vertical sync pulses within the VBI, until step 106 which has a yes output at the end of the VBI. The VBI gate timing from the timing data step 102 until the end of step 106 is determined by an internal timer in the microprocessor. The gain is then decreased, as indicated by step 108, which provides the start of step 110, which times out at for the end of the field. At the end of the field, the gain is again increased, as indicated by step 112. The gain will remain at an increased level during the time that the microprocessor is searching for the VBI timing data, as indicated in step 114. This search will continue until either the VBI timing data is found or until the VBI search time-out period is reached, as indicated by step 116. If the VBI search times out, the gain will be lowered, as indicated at step 118, and the entire cycle, beginning at the reset of the field counter, will be initiated. If the VBI timing data is found within the allocated search period, the number of fields counted is checked in step 120. If the VBI gain has been gated up for less than 20 consecutive fields, the field counter is incremented in step 122 and the cycle is repeated for another field. If the field counter count is 20, in step 120, the acquisition routine is exited.

The result of the program illustrated in FIG. 6 is to settle the AGC control to provide proper IF gain and video signal level. The flow chart of FIG. 6 describes what may be termed the acquisition portion of decoding. Once the VBI timing data has been successfully acquired by the microprocessor, the microprocessor enters the decode mod.. This mode follows the program of FIG. 3, except that the VBI timing signal is used instead of VEX and the gated attenuator is used to increase the signal level for the entire vertical blanking interval. By raising the gain of the entire vertical blanking interval, there is horizontal sync in that interval for use by the decoder to develop horizontal sync gates for the attenuated horizontal sync pulses of each horizontal line in the picture video. Thus, the program for decoding in the microprocessor for an attenuated sync pulse encoding system will function the same as the program for decoding in the sync level shifting encoding system, as shown in FIGS. 1-3, in that the restored horizontal and vertical sync in the VBI provides the timing for the horizontal sync gate which in turn increases the gain of the gated attenuator during the period of horizontal sync.

The present invention provides a universal decoder module which has a microprocessor with multiple programs for use in decoding different types of encoded video signals. When it has been determined which type of encoding is used on a particular cable television system, and depending on whether the system has addressable converters, the selection of the particular program needed to decode the encoded video either can be communicated to a subscriber through the address format of the cable system, or if the individual subscribers are not individually addressable, then each decoder module may be mechanically configured to accept a particular type of encoding. Such a mechanical configuration could be by a hard wire, switch or otherwise.

The invention provides a means whereby a particular cable system is not forever married to the converter/decoders of a particular manufacturer. The universal decoder is able, through one of its several programs, to decode many varieties of suppressed sync encoded video, whether or not video inversion is included in such. This has the advantage that the cable system operator may use different manufacturers' hardware and the decoder module may be used as an add-on to provide decoding for an otherwise non-decoding converter. However, some converters or decoders may not contain some of the circuitry which exists in the embodiment described above (such as the video inverter or sync separator) and this circuitry would have to be added Whereas the preferred form of the invention has been shown and described herein, it should be realized that there may be many modifications, substitutions and alterations thereto.

The embodiments of the invention in which an exclusive property or privilege is claimed are defined as follows:

1. A decoder for decoding suppressed sync encoded television video signals in which horizontal sync pulses are suppressed during picture video,
   said decoder including a microprocessor programmed to determine horizontal sync timing from timing signals in the vertical blanking interval (VBI), means for providing the timing signals in the VBI to the microprocessor, a sync restoration circuit connected to said microprocessor, said microprocessor being further programmed to provide a horizontal sync gate signal, based on the timing signals in the VBI, to said sync restoration circuit whereby said sync restoration circuit restores the suppressed horizontal sync pulses.

2. The decoder of claim 1 further characterized in that the timing signals in the VBI are unsuppressed horizontal and vertical sync pulses in the VBI.

3. The decoder of claim 2 further characterized in that said microprocessor is programmed to initiate its timing reconstruction cycle at the beginning of vertical sync timing and to begin the horizontal sync gate signal after the last unsuppressed horizontal sync timing signal in the VBI.

4. The decoder of claim 3 further characterized in that said microprocessor is programmed to provide a horizontal sync gate signal for each suppressed horizontal sync pulse during a period of picture video.

5. The decoder of claim 1 further characterized in that horizontal sync pulse may be suppressed during the picture video by a) shifting the level of the horizontal sync pulses of a baseband video signal, or b) attenuating the horizontal sync pulses of a video signal.

6. The decoder of claim 1 further characterized in that the video encoding includes periodic inversion of video signal polarity, said microprocessor being programmed to detect a video inversion flag and to provide a video inversion gate output as a result thereof.

7. The decoder of claim 1 further characterized in that the VBI including horizontal and vertical sync pulses in the VBI are suppressed and the timing signals in the VBI are inserted in the VBI during signal encoding.

8. The decoder of claim 7 further characterized in that said microprocessor is programmed, upon detection of the VBI timing signals, to increase the amplitude of the VBI including sync pulses.

9. The decoder of claim 8 further characterized in that said microprocessor is programmed to utilize the increased amplitude horizontal sync pulses during each VBI to generate timing for a horizontal sync gate signal to increase the amplitude of horizontal sync pulses during picture video.

10. The decoder of claim 7 further characterized in that the VBI timing signal consists, in successive horizontal lines, of a plurality of generally equally spaced pulses in a first line and a complement of said plurality of spaced pulses in the succeeding line.

11. The decoder of claim 10 further characterized in that said VBI timing signal includes, in a horizontal line preceding the first horizontal line having a plurality of spaced pulses, a horizontal line which has a generally constant IRE level over at least a substantial portion thereof, with the IRE level being equal to that of the pulses in the succeeding line.

12. The decoder of claim 1 further characterized in that the microprocessor has a clock signal which is asynchronous with the received horizontal sync.

13. The decoder of claim 1 further characterized in that the microprocessor program has multiple segments, each program segment having the capability of recognizing a particular timing signal and providing a horizontal sync restoration gate responsive to a particular version of horizontal sync suppression, said program segments being selectable by means external to the microprocessor.

14. A method of decoding suppressed sync encoded video signals in which horizontal sync is suppressed during picture video, said method including the steps of:
   obtaining timing signals from the video vertical blanking interval (VBI), providing the timing signals to a microprocessor programmed to determine horizontal sync pulse timing and to provide a horizontal sync gate signal from the timing signals in the VBI, using the microprocessor to provide a horizontal sync gate signal from said timing signals, and using the horizontal sync gate signals to restore suppressed horizontal sync pulses.

15. The method of claim 14 further characterized in that the suppressed sync encoded video signals are encoded by either a) shifting the level of horizontal sync pulses or b) attenuating the horizontal sync pulses.

16. The method of claim 14 further characterized in that the timing signals in the VBI are unsuppressed horizontal and vertical sync pulses in the VBI.

17. The method of claim 14 further characterized in that the timing signals in the VBI are inserted in the VBI during signal encoding.

* * * * *